United States Patent Office 3,547,924
Patented Dec. 15, 1970

3,547,924
PROCESS FOR PREPARING VAT DYESTUFFS
Otto Fuchs and Heinrich Sieber, Frankfurt am Main, and Josef Landler, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 13, 1969, Ser. No. 866,001
Int. Cl. C07d 39/00
U.S. Cl. 260—274                                                    4 Claims

ABSTRACT OF THE DISCLOSURE

Improved process for the preparation of dyestuffs of the general formula

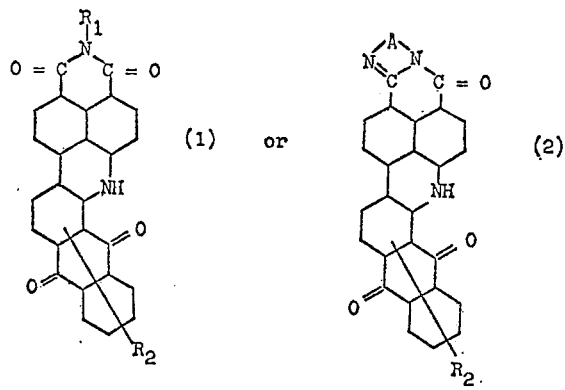

wherein the corresponding anthrimides are heated in substance or in form of an intimate mixture with a water-soluble, indifferent inorganic salt to a temperature between 300° and 400° C., preferably 340° and 370° C. Compared with the process of U.S. Pat. 3,310,563 the process of the present invention represents a major technical progress insofar as the yield is practically quantitative, acid amides or high boiling solvents are saved, the isolation of the dyestuffs is more convenient and the required apparatus volume smaller.

The present invention provides a process for preparing vat dyestuffs. It has been found that vat dyestuffs having the general formula

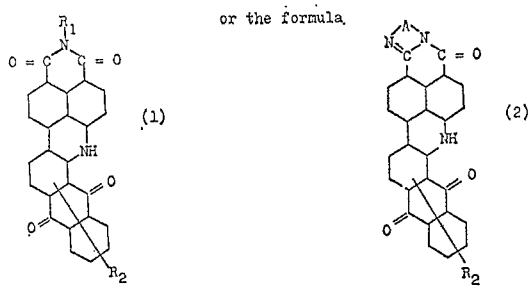

in which $R_1$ represents a hydrogen atom or an alkyl or aryl radical that may be substituted, $R_2$ represents a hydrogen or chlorine atom or an alkoxy or benzoylamino group and A is an arylene radical that may be substituted, can be prepared by heating anthrimides of the general formula

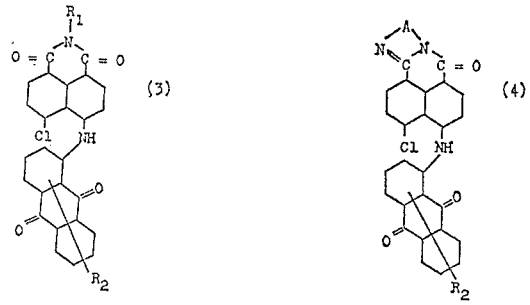

wherein $R_1$, $R_2$ and A are defined as above, either alone or mixed with an inert salt, to about 300–400° C., preferably about 340°–370° C.

In said process this procedure may be followed: The anthrimide serving as starting compound is spread out in finely divided form, as a thin layer, in an appropriate vessel and heated at the indicated temperatures in an electric furnace until splitting off of the hydrogen chloride has been terminated. After cooling, the dyestuff can be isolated in, practically, quantitative yield and very pure form.

However, a technically more advantageous procedure permitting a simple isolation of the dyestuff consists in mixing the finely ground anthrimide with 3–10 times its amount of an inert, water-soluble salt acting as carrier, heating the whole, while continuously stirring at the temperatures indicated above in an electrically heated vessel until splitting off the hydrogen chloride has been terminated.

After cooling, the content of the vessel is poured onto water, the salt is dissolved out, the dyestuff filtered, washed with water and dried. The product is obtained in practically, quantitative yield and very pure form.

The process may also be performed in a continuous way by feeding the anthrimide salt mixture via a dosing device into an appropriate electrically heated tube which has an inner screw and passing it slowly through the heated zone. The dyestuff/salt mixture which leaves the end of the tube is worked up as disclosed above.

As inert salts for example alkali metal halides such as sodium chloride or potassium chloride may serve, moreover alkali metal sulfates such as sodium sulfate or potassium sulfate, furthermore, sodium bisulfite or potassium bisulfite.

In the instant process the ring closure takes place without the aid of condensing agents. The addition of condensing agents, especially of alkaline ones, even negatively influences the yield of the dyestuffs of the invention impairing at the same time their purity. The latter fact must be considered as surprising and not at all obvious insofar as in ring closure reactions of said kind condensing agents are used for increasing the yield and for obtaining a product of greater purity.

In comparison to the process disclosed in U.S. Pat. No. 3,310,563 the process of the invention offers the following substantial advantages:

(1) The yield is, practically, quantitative and exceeds, on an average, the yield of the process of said patent by 10–15%.

(2) The ring closure takes place without use of acid amides or solvents having a high boiling point the regeneration of which together with the occurring loss of dyestuff renders the process much more expensive.

(3) Isolation is effected in the simplest possible way, whereas when condensed in a solvent, the dyestuff must be isolated from the latter which is possible with great expenditure only.

(4) A small volume of apparatus is required compared to the volume of apparatus necessary for the manufacture of dyestuffs in solvents having a high boiling point.

The anthrimides used as starting substances in the instant process can be prepared according to the method disclosed in U.S. Pat. 3,310,563 by reaction of 4,5-dichloronapthal imides or 4,5 - dichloro-1,8-naphthoylene-arylimidazoles with 1-amino-anthraquinones.

The following examples serve to illustrate the invention. The parts and percentages are by weight unless otherwise stated.

EXAMPLE 1

A mixture consisting of 270 parts of sodium chloride and 30 parts of an anthrimide having the formula

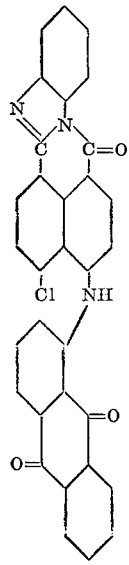

was heated with slow stirring to 330°–350° C. in an open vessel equipped with a powerful stirring apparatus and kept at that temperature for 30–60 minutes. After cooling, the content of the vessel was stirred into water, the dyestuff was isolated after dissolution of the sodium chloride, washed with water and dried. The dyestuff which was obtained in almost quantitative yield dyed cellulose fibres the same pure and olive shade as was produced according to Example 1 of U.S. Pat. 3,310,563.

When instead of sodium chloride a corresponding amount of potassium chloride, sodium sulfate or potassium sulfate was used, equivalent results were obtained.

EXAMPLE 2

A mixture of 100 g. of the anthrimide of formula

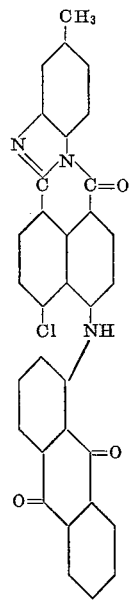

and 1200 parts of sodium chloride was dosed into a heatable cylindrical tube equipped with a screw scraping along the wall of the tube and capable of conveying a pulverulent mass fed in at one end to the other via a heated zone. The tube was heated in a manner that the fed-in pulverulent mixture should, on passing through, quickly reach a temperature between 350°–380° C. The number of revolutions of the screw was calculated such that the heated matter should retain the temperature of 350–380° C. during the time necessary to split off the hydrogen chloride which required about half an hour. The material which has cooled down in the back part of the tube dropped while still hot into a stirred vessel filled with water, whereby the sodium chloride went in solution. Subsequently, the dyestuff was isolated. The yield in dyestuff was, practically, quantitative.

EXAMPLE 3

When instead of the mixture indicated in Example 1 a mixture comprising 50 parts of the anthrimide of the formula

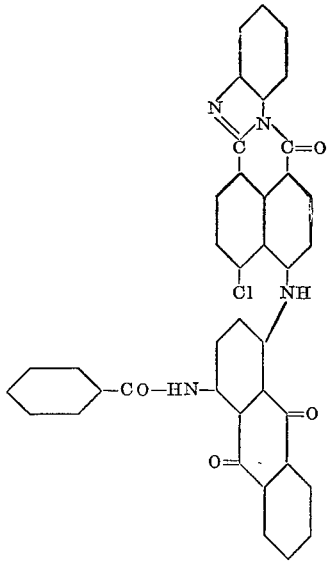

and 500 parts of sodium chloride was used and the same procedure was otherwise followed, a yellowish green dyestuff was obtained in excellent yield equivalent in shade and purity to the one produced according to Example 4 of U.S. Pat. 3,310,563.

When the anthrimide of formula

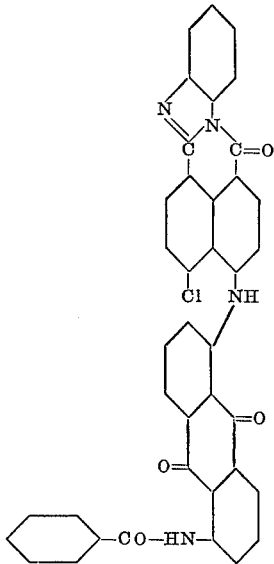

was used, a clearly more bluish olive green vat dyestuff was obtained in analogous good yield.

EXAMPLE 4

30 parts of the anthrimide of formula

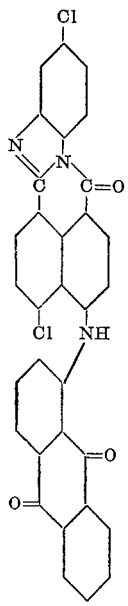

were heated spread ou tas a thin layer on a metal sheet for 30 minutes to 350° C. in an electric furnace. After a short melting, the previously brown anthrimide turned under split off of hydrogen chloride into a dyestuff solidifying in blackish crystals.

Said dyestuff which was obtained in very good yield had a sufficient purity and could be used immediately and without further cleaning for the manufacture of dyestuff powders or printing pastes.

EXAMPLE 5

In using for the ring closure the anthrimide of formula

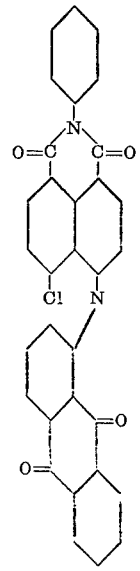

according to the methods described in Examples 1, 2 or 4, the same dyestuff was obtained as disclosed in Example 5 of U.S. Pat. 3,310,563.

What we claim is:
1. A process for preparing a dyestuff of the formula

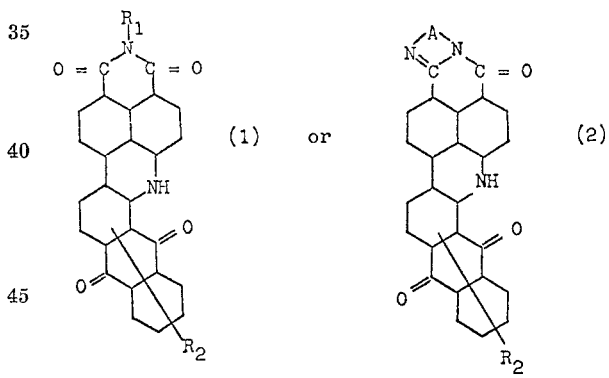

in which $R_1$ is hydrogen, lower alkyl or phenyl, $R_2$ is hydrogen, chlorine, lower alkoxy or benzoylamino, A is o-phenylene or o-phenylene substituted by one or two members selected from the group consisting of chlorine and methyl, which comprises heating a compound of the formula

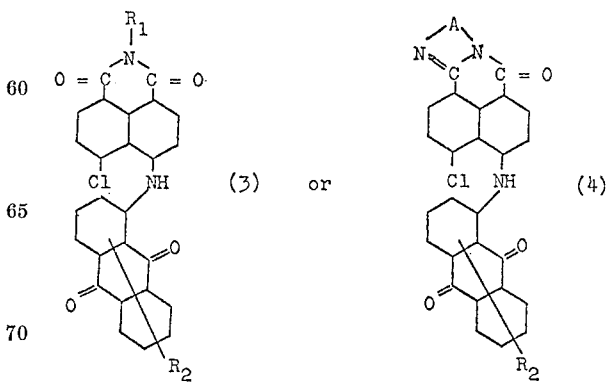

wherein $R_1$, $R_2$ and A have the meanings given above to a temperature between about 300° and 400° C.

2. The process as claimed in claim 1, wherein the starting compound is heated to a temperature between about 340° and 370° C.

3. The process as claimed in claim 1, wherein the starting compound is heated in form of an intimate mixture with a water-soluble, indifferent inorganic salt.

4. The process as claimed in claim 1, wherein the starting compound is heated in form of an intimate mixture with sodium chloride, potassium chloride, sodium sulfate, potassium sulfate, sodium bisulfite and/or potassium bisulfite.

References Cited
UNITED STATES PATENTS

| | | | |
|---|---|---|---|
| 2,069,663 | 2/1937 | Wolfram et al. | 260—274 |
| 3,138,612 | 6/1964 | Kastner | 260—281X |
| 3,310,563 | 3/1967 | Sieber et al. | 260—274 |

DONALD G. DAUS, Primary Examiner

U.S. Cl. X.R.

260—281, 282